United States Patent
Parker et al.

(10) Patent No.: US 6,912,563 B1
(45) Date of Patent: Jun. 28, 2005

(54) METHODS AND SYSTEMS FOR PROACTIVE ON-LINE COMMUNICATIONS

(75) Inventors: Robert Parker, Gainesville, FL (US); Michael Privat, Gainesville, FL (US)

(73) Assignee: Digi-Net Technologies, Gainesville, FL (US)

( * ) Notice: Subject to any disclaimer, the term of this patent is extended or adjusted under 35 U.S.C. 154(b) by 708 days.

(21) Appl. No.: 09/739,238

(22) Filed: Dec. 19, 2000

(51) Int. Cl.[7] .............................................. G06F 15/16
(52) U.S. Cl. ..................................... 709/204; 709/227
(58) Field of Search ............................. 709/204–206, 709/224, 219, 227; 345/751, 753, 758

(56) References Cited

U.S. PATENT DOCUMENTS

| | | | | |
|---|---|---|---|---|
| 5,991,735 A | * | 11/1999 | Gerace | 705/10 |
| 6,070,149 A | * | 5/2000 | Tavor et al. | 705/26 |
| 6,615,251 B1 | * | 9/2003 | Klug et al. | 709/218 |
| 6,615,258 B1 | * | 9/2003 | Barry et al. | 709/223 |
| 6,654,726 B1 | * | 11/2003 | Hanzek | 705/26 |
| 6,701,362 B1 | * | 3/2004 | Subramonian et al. | 709/224 |
| 6,704,732 B1 | * | 3/2004 | Barclay | 707/10 |
| 2003/0158897 A1 | * | 8/2003 | Ben-Natan et al. | 709/204 |

FOREIGN PATENT DOCUMENTS

WO     WO 9726729 A2 * 7/1997

* cited by examiner

Primary Examiner—Frantz B. Jean
(74) Attorney, Agent, or Firm—Finnegan, Henderson, Farabow, Garrett & Dunner, L.L.P.

(57) ABSTRACT

On-line communications methods and systems are shown that operate between a website operator and a website visitor visiting a website. A visitor list is maintained that includes visitors currently accessing operator contact-enabled web pages. A visitor path record is maintained that corresponds to at least one visitor in the visitor list by recording information about web pages that a visitor accesses. The visitor may be assigned to a group based on the visitor path record. Information is transmitted to a website visitor in the list of visitors based upon information compiled for the visitor path record. Information is received from the website visitor in response to the transmitted information. The information transmitted to the visitor may include an inquiry or a web-page selected from a pre-determined list, or a dialog with an operator.

78 Claims, 9 Drawing Sheets

| Groopz Operator |||||||
|---|---|---|---|---|---|---|
| 815 Control   Actions   Display   Help |||||||
| path 830 | | push 840 | | away 850 | | logout 860 |
| 817 guest | operator ||||||
| Name | A/by | IP | Current page | Time on page | Time on site ||
| Guest 123 | | 192.1.1.2 | Product info | 13:41 | 15:28 870 ||
| Guest 124 | | 128.2.2.8 | Downloads | 0:13 | 1:57 ||
| Guest 126 | | 206.1.8.3 | FAQ | 1:21 | 3:29 ||
| Client Calls Queue ||| User Properties ||||
| Name | IP | Enqueued | User Name | Guest 842 |||
| Guest 855 | 206.14.5.2 | 8:15:41 PM | User Language | Last Assisted  880 |||
| 890 ||| Assisted | User Name |||
| ^ ||| Assisted by | Support Kurt |||
| ^ ||| Last Assisted | 5:49 PM |||
| ^ ||| IP | 206.199.147.2 |||
| ^ ||| Browser | InternetExplorer |||
| ^ ||| Operating System | Windows 95 4.0 |||

METHODS AND SYSTEMS FOR PROACTIVE ON-LINE COMMUNICATIONS

FIELD OF THE INVENTION

The present invention relates generally to methods and systems of on-line communication, and more particularly is concerned with facilitating communication between an operator of a website and website visitors.

BACKGROUND OF THE INVENTION

The Internet is a world-wide collection of inter-connected networks that is widely used to access information, communicate, and carry out business transactions. A web server is an Internet-connected computer system that can provide information to Internet-connected client computers. Client computers use a computer program called a web browser to connect to and access information on web servers. Using a web browser, a user of an Internet-connected computer can access a huge number of different web servers. The vast collection of web servers available on the Internet is frequently referred to as the World Wide Web.

A web browser displays information received from a web server in units that have the appearance of pages, and because of their appearance, the pages downloaded from web servers and displayed by web browsers are frequently referred to as web pages. Web pages contain elements including formatted text, images, and links. A link is an active connection to other web pages and may be expressed as a Uniform Resource Locator ("URL"), which is the addresses of a web page. When a user selects a link, his or her web browser will then request and receive the web page corresponding to the URL of the link.

The collection of web pages associated with a web server of a particular name is frequently referred to as a website. Many websites provide information that is continually updated. The person that coordinates the updating of information on a website and ensures its proper continued operation may be referred to as a website operator. A website operator may monitor the operation of the website, considering, for example, past statistics including the number of times a particular web page has been accessed in the past.

A website visitor is a person who uses a web browser to "visit" a website, that is, request and receive web pages of the website . By using a web browser to connect to a website and by selecting links within a website that allow a website visitor to navigate among the various web pages within a website, a website visitor may access all of the information a website operator wishes to provide to the website visitor. When data transfer is initiated by the website visitor, it is sometimes referred to as "pulling content," because from the perspective of the website visitor, content is being pulled down to his or her browser. Conversely, when data transfer is initiated at the web server it is referred to as "pushing content."

The dominant protocol suite used on the Internet is the Transmission Control Protocol and Internet Protocol ("TCP/IP") suite. Web servers and web browsers use the Hypertext Transfer Protocol ("HTTP"), which is built upon TCP/IP, to exchange information. Establishment of a connection between a web browser and a web server begins with a web server process waiting or listening for a connection at a placeholder on the server known as a "port," which, in the case of HTTP is usually port 80. A client establishes a logical network connection by connecting to port 80. Once the network connection is established, the software in the web server and web browser uses the network connection to send and receive data. The software construct that a program uses to send and receive data over the network connection is referred to as a "socket."

Current methods of communication between website operators and website visitors comprise methods in which a visitor is given an opportunity to send a message to an operator. The visitor may ask a question or request additional information. Many websites merely provide a catalog or a list of products that are offered for sale. These systems do not provide a means for a website operator to contact a visitor to offer help and answer individual questions or to provide additional information. In many cases existing systems do not provide a reliable means to determine whether a product is actually in stock, and, even if a traditional website contains an in-stock indicator, it is not possible for a potential customer to receive actual confirmation that the in-stock indicator is actually correct. Other questions a website visitor may wish to ask include how many of the products are shipping, and if a product is not in stock, when the product will become available. In many traditional websites, a potential customer has no way to ask whether a product will interoperate with a particular peripheral, etc. The answers to these types of questions can be crucial to concluding a sale, and current systems do not provide a means for operators to proactively contact visitors and push out web content or proactively provide website visitors with necessary information.

SUMMARY OF THE INVENTION

The present invention provides methods and systems for facilitating on-line communications between a website operator and a website visitor visiting a website. Consistent with the present invention, a visitor list is maintained that includes visitors currently accessing operator contact-enabled web pages. A visitor path record is maintained that corresponds to at least one visitor in the visitor list by recording information about web pages that a visitor accesses. Information is transmitted to a website visitor in the list of visitors and information is received from the website visitor in response to the transmitted information.

It is to be understood that both the foregoing general description and the following detailed description are exemplary and explanatory only and are not restrictive of the invention, as claimed.

The accompanying drawings, which are incorporated in and constitute a part of this specification, illustrate one several embodiment of the present invention and together with the description, serve to explain the principles of the present invention.

DETAILED DESCRIPTION

Reference will now be made in detail to exemplary embodiments of the invention, an example of which is illustrated in the accompanying drawings. Wherever possible, the same reference numbers will be used throughout the drawings to refer to the same or like parts.

Figure 1:
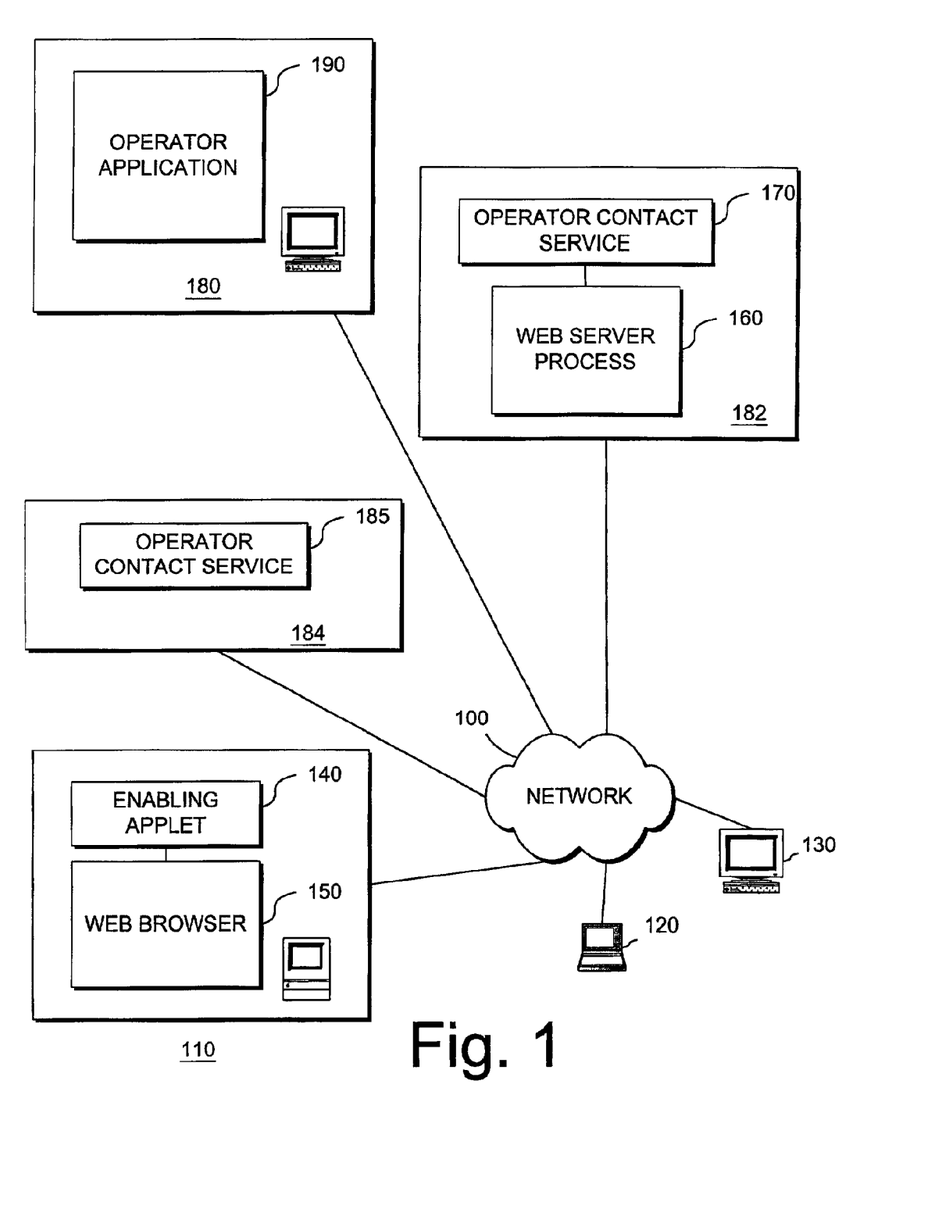
FIG. 1 is a schematic diagram of a system in which the present invention may be practiced.

FIG. 1 is a schematic diagram of a system in which the present invention may be practiced. The system provides a means for facilitating access by network-connected client computer systems to particular web servers. A network 100, such as the Internet, is shown with connections to a plurality of client computer systems, such as client computer systems 110, 120, and 130. These systems may have various types of connections to network 100, including, for example, analog dialup, DSL, cable modem, wireless, cellular, fiber optics, or any other networking technology used to connect a computer system to a network. The network may use the TCP/IP protocol suite and the HTTP protocol or any other networking protocol. Routers, switches, bridges, firewalls, and other types of networking equipment may comprise portions of network 100.

As shown, a client computer system 110 may contain a web browser 150 which is a computer software program such as the Netscape Navigator Internet web browser or the Microsoft internet Explorer Internet web browser. In systems consistent with the present invention, the browser software may have an integrated runtime environment for executing software programs that may be downloaded over network 100. An example of such an environment is the JAVA™ applet runtime environment as contained in various versions of the two browsers named above. In order to operate in a mode consistent with the present invention, a user may cause browser 150 to download an applet such as the enabling applet 140. Enabling applet 140 is a small program that may be automatically downloaded over network 100 and executed in an integrated runtime environment within web browser 150. Enabling applet 140 allows web pages to be made operator contact-enabled.

In one embodiment of the present invention, enabling applet 140 is caused to be downloaded to web browser 150 from server computer 182. Enabling applet 140 applet may be displayed as an image associated with a customer support function so that if a website visitor clicks on the image, it will send a message to an operator indicating that a user has requested assistance. An enabling applet 140 consistent with the present invention may be associated with a set of web pages referred to, for the sake of discussion, as operator contact-enabled web pages. Operator contact-enabled web pages are those web pages containing enabling applet 140 that facilitates the real-time monitoring of website visitor activity and that facilitates communication between a website operator and a website visitor.

An enabling applet is downloaded from web server process 160 when a visitor accesses an operator contact-enabled web page. This occurs as a result of methods for associating applets with web pages that are well known in the art, including, for example, inserting applet tags into web pages. The operator contact-enabled web pages are provided to client computers 110, 120, and 130 over network 100 by web server process 160. Web server process 160 may be, for example, the Apache web server, the Internet Information Server from Microsoft, or the Netscape Enterprise Web server from Netscape.

Web server process 160 has associated with it the operator contact service 170 which may be, for example, a JAVA™ application running in a JAVA™ Virtual Machine ("JVM") on the same server machine as the web server process 160. It is not necessary that operator contact service 170 be executed on the same server computer system as web server process 160. However, as is understood by one skilled in the art, additional steps must be taken to satisfy security models such as the JAVA™ applet security model, if operator contact service 170 is resident on a server other than the server on which web server process 160 is resident. If an operator contact service executes on a computer system other than one which is executing web server process 160, then it would be connected to operator computer 180 and client computer systems 110, 120, and 130 via the network. Nevertheless, by using a network connection to the computer system on which web server process 160 is executing, operator contact service 185 can operate on server computer 184 in the same way as operator contact service 170 on server computer 182. It is known in the art that processes can interoperate by exchanging information over a network similar to the way processes interoperate when they exchange information through memory while executing on a single machine.

Operator contact service 170 receives information about a website visitor's activities as the website visitor accesses operator contact-enabled web pages. For example, operator contact service 170 receives a connection from an enabling applet each time a new operator contact-enabled web page is accessed. This allows operator contact service 170 to maintain records related to various aspects of a website visitor's web browsing activities, such as, for example, which pages a visitor has accessed, how many times a visitor has accessed a particular page, and how long a visitor has been browsing a particular page or the entire site.

FIG. 1 also shows operator computer system 180 which may be similar to client computer systems 110, 120, and 130. Operator computer system 180 can be used by an operator of web server process 160 and operator contact service 170 to obtain information about the functioning of web server process 160 and operator contact service 170. In particular, an operator can execute operator application 190, that may be written in the JAVA™ programming language, on operator computer system 180 and obtain a list of website visitors currently visiting operator contact-enabled web pages. An operator can then proactively send messages to these visitors as described in FIG. 6.

Figure 2:
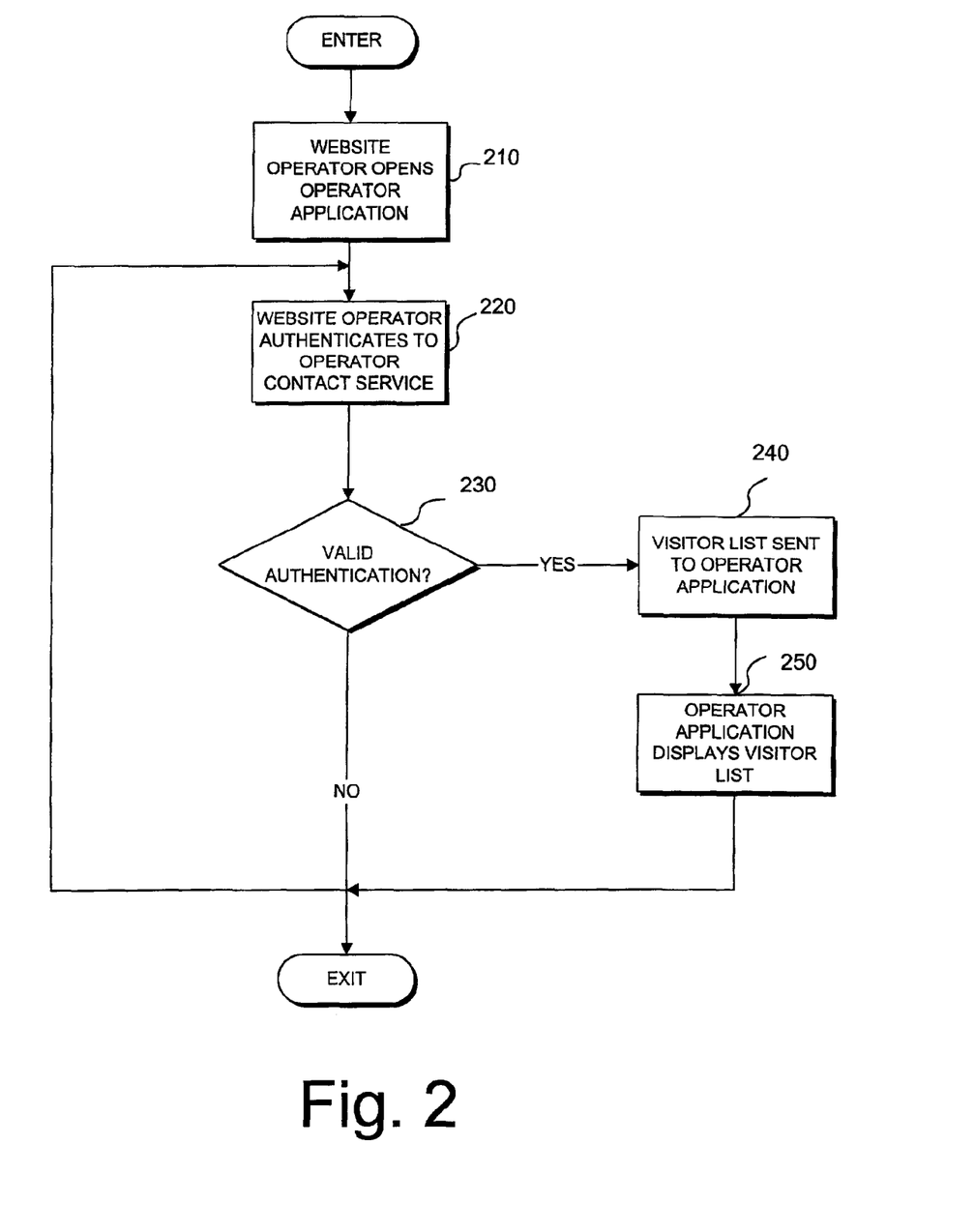
FIG. 2 is a flow diagram of a method for authenticating an operator and transmitting a website visitor list to an operator application consistent with the present invention.

FIG. 2 is a flow diagram of a method for authenticating an operator and transmitting a website visitor list to operator application 190 consistent with the present invention. On operator computer 180, an operator launches operator application 190 (step 210). The operator uses operator application 190 to log in or authenticate to operator contact server 170 (step 220). As is well known in the art, there are many ways for a client to authenticate to a server, including the use of a password, biometrics, or a digital certificate etc.

Figure 8:
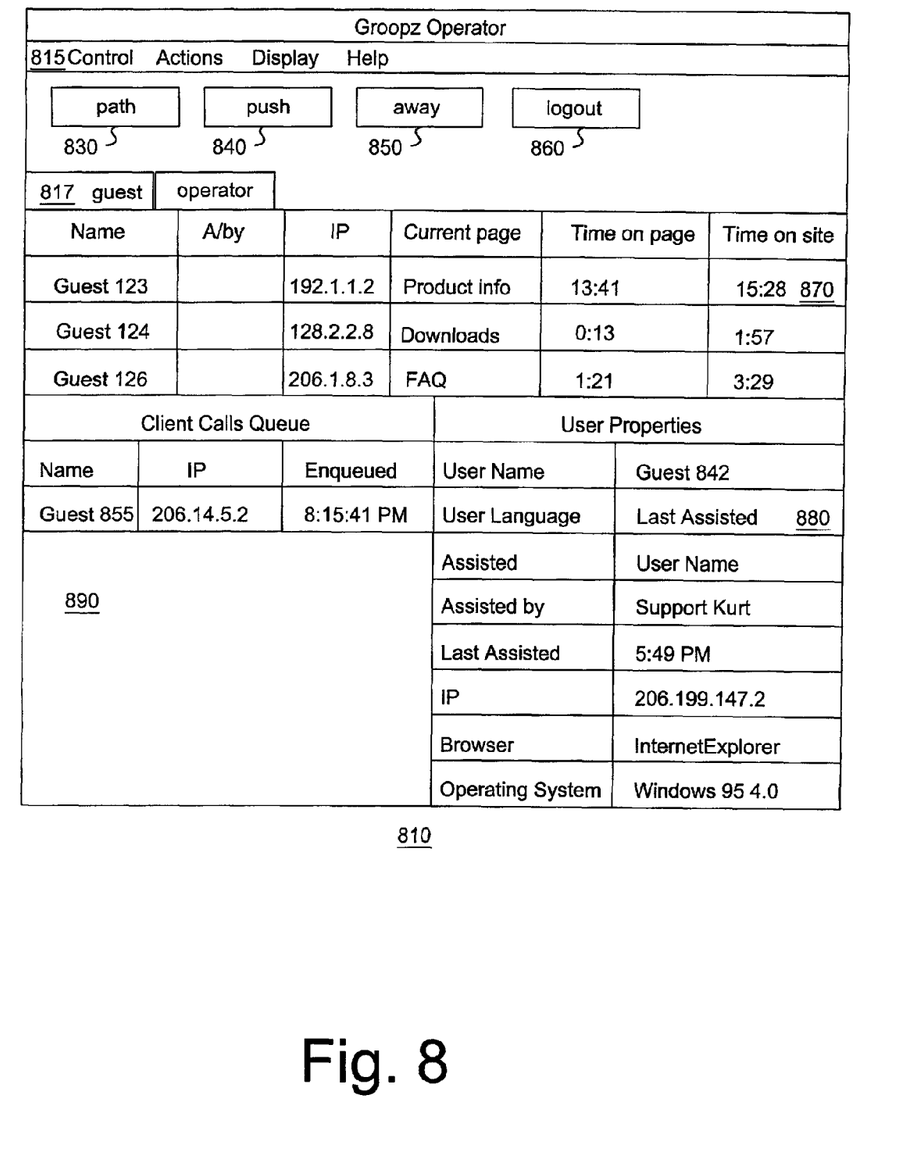
FIG. 8 is a schematic diagram of an operator application user interface consistent with the present invention.

In step 230, it is determined whether the login information provided by the operator is valid. If it is not valid, then the method may end, or, in another embodiment consistent with the present invention, the operator may be given another opportunity to present valid authentication information. In either case the server will provide some response to the operator. If valid information is presented, then the server transmits the website visitor list to the operator application (step 240). Finally, in step 250, the operator application displays the website visitor list so that an operator can select a particular visitor to contact and provide information or to view the visitor path information for a particular visitor as shown in FIG. 8.

Figure 3:
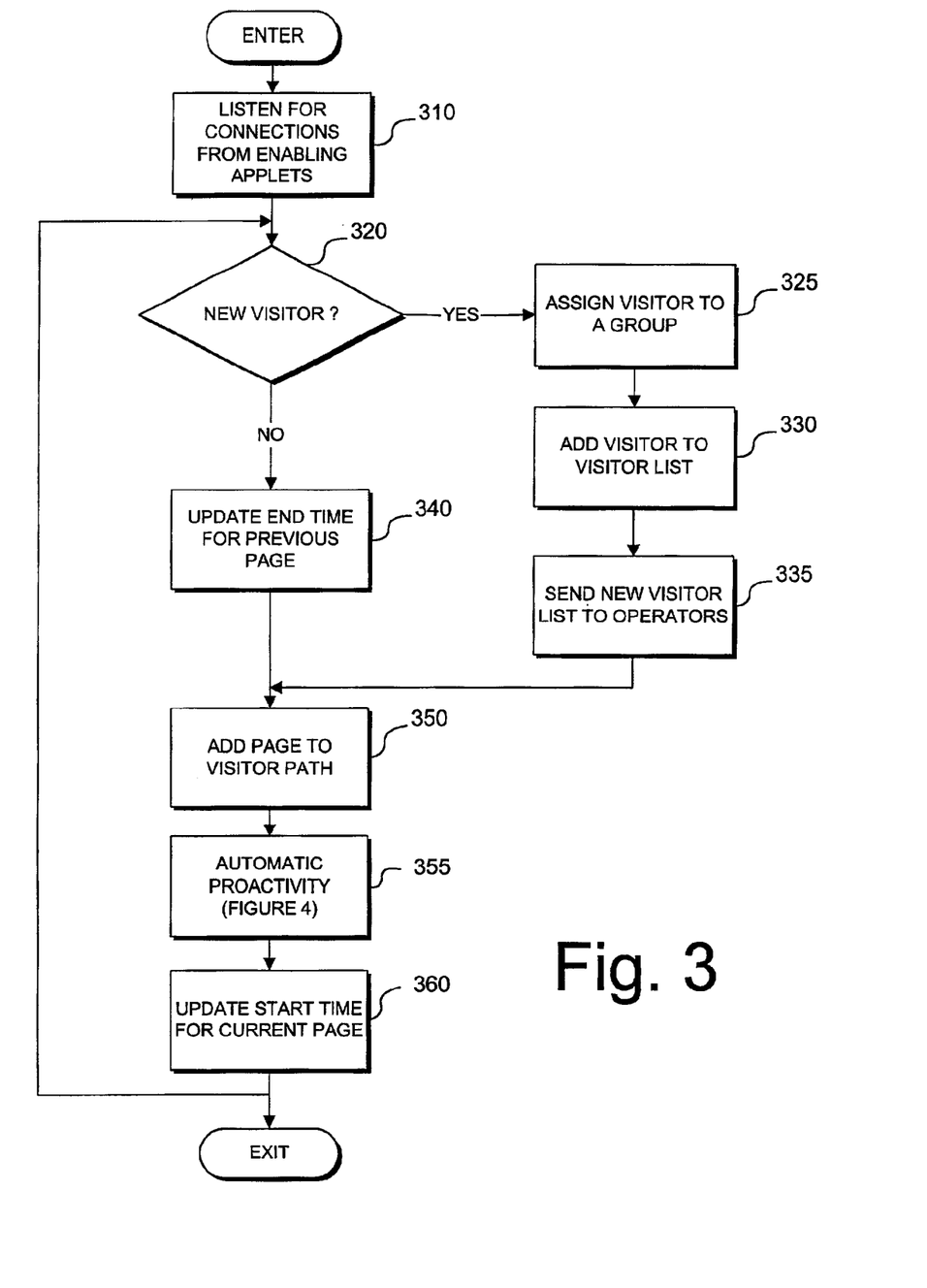
FIG. 3 is a flow diagram of a method for updating a website visitor list consistent with the present invention.

FIG. 3 is a flow diagram of a method for updating a website visitor list consistent with the present invention. As an operator contact service receives information about the paths a website visitor takes through an operator contact-enabled website, the operator contact service maintains a list of currently connected visitors. In step 310, the operator contact service waits for network connections from enabling applets. This network connection could be, for example, standard TCP/IP sockets on which the operator contact service listens and waits for a enabling applet to make a connection to the operator contact service. When a new connection is made, the operator contact service determines whether the new connection is from a new website visitor, i.e. a website visitor not currently in the list (step 320). The method first determines whether the connection is from a new website visitor so that an accurate list of website visitors currently connected to the operator contact-enabled website can be compiled. In a method consistent with the present invention, the enabling applet may log out a website visitor each time the visitor changes web pages, nevertheless temporarily keeping the visitor's information in memory so that if and when the visitor accesses another operator contact-enabled website, the visitor list can be properly maintained.

If the connection is from a new website visitor, then the website visitor is assigned to a group (step 325) and added to the website visitor list (step 330). The website visitor list can be, for example, a linked list or array of data structures or objects maintained in the memory of a computer system executing the operator contact service. In an embodiment consistent with the present invention, the newly updated website visitor list is transmitted to operator application 190 of FIG. 1 (step 335). The operator application displays the list of visitors as shown in FIG. 8 below.

If the connection is accepted from an enabling applet being executed by a website visitor that is already in the website visitor list, i.e. the visitor is not a new visitor, then the visitor has either selected an operator contact-enabled page that the visitor had not previously selected, or else the visitor has reloaded the same operator contact-enabled page. In either case, the operator contact service saves a timestamp corresponding to the end time associated with the duration of time the visitor had been viewing the page (step 340).

Next, the two paths merge and, regardless whether the connection is from a new visitor, the page currently being accessed is added to the visitor's path record, which comprises a record of the path through the operator contact-enabled website that the visitor has taken (step 350). If the visitor has reloaded a page that he or she was already viewing or if the visitor has returned to a page that he or she had already visited in the current session, then a new page entry will not be created. However, a counter, associated with the visitor path record, of the number of times the page is accessed could be incremented, for example. When a new path entry is added to a visitor path record as in step 350, the updated visitor information including the visitor path record and any other user properties a website operator has obtained about a website visitor is compared to a set of rules specified by the website operator. This comparison is represented by step 355 and further described in FIG. 4. Once a new entry for the currently viewed web page exists in the page list, a time stamp is recorded indicating the time the visitor began viewing the page (step 360). At this point the operator contact service again waits for additional connections.

Figure 4:
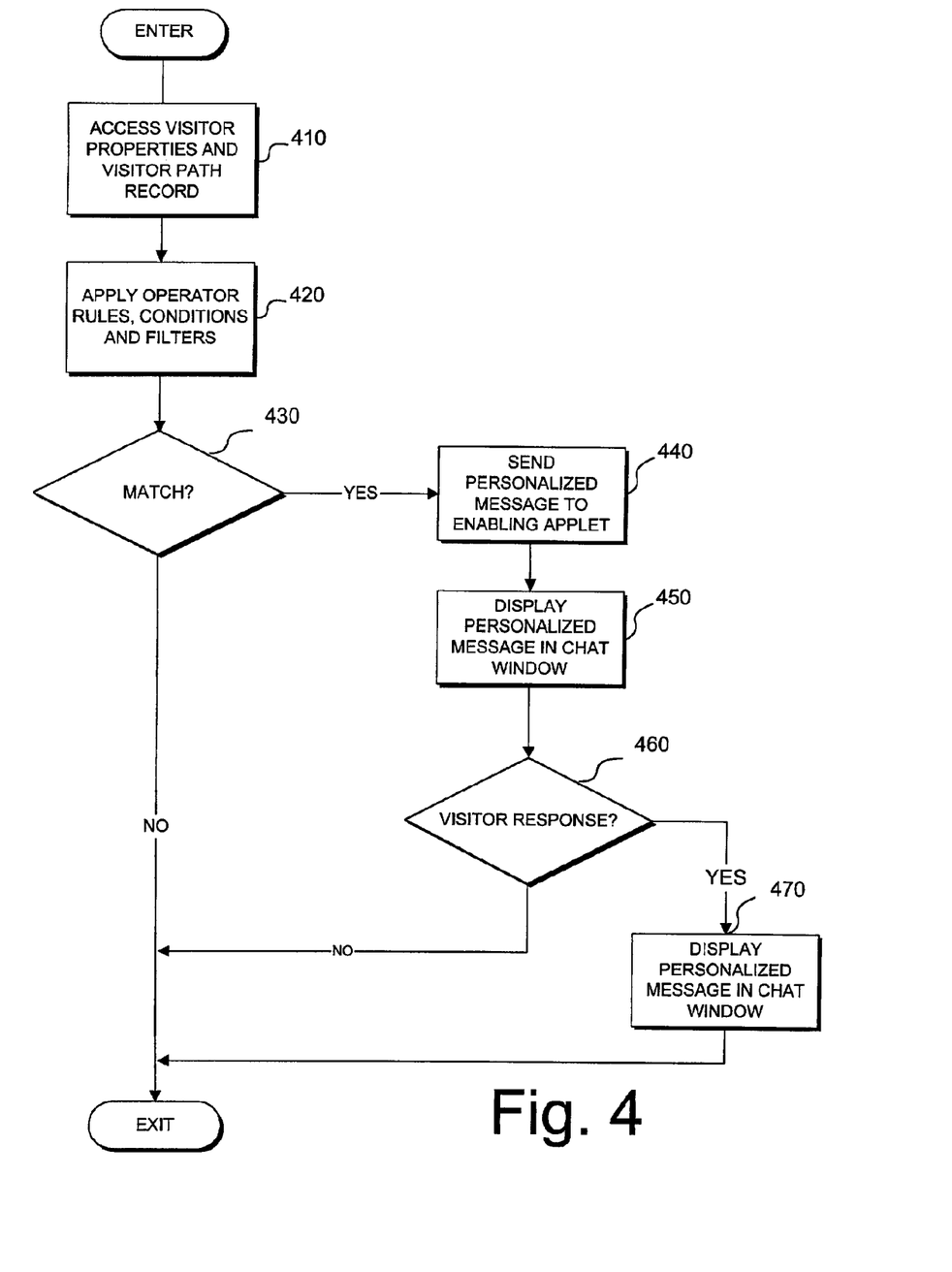
FIG. 4 is a flow diagram of a method for automatically contacting website visitors consistent with the present invention.

FIG. 4 is a flow diagram of a method for automatically contacting website visitors consistent with the present invention. In step 410, the operator contact service accesses information about a website visitor including the visitor properties and the visitor path record. Next the operator contact service applies predetermined rules specified by the operator (step 420). An example of such a rule is "only those website visitors that have accessed, for a specified period, a page relating to a particular product. At step 430, the operator contact service determines whether the visitor information and the rules match. If they do not, then the website visitor is not automatically contacted. On the other hand, if the rules do match then the operator contact service automatically sends a message to the website visitor (step 440). Next the enabling applet displays the message in a chat window in a manner that appears identical to the situation in which a live operator sends a message to a website visitor (step 450). At step 460, the enabling applet determines whether the visitor provides a response to the message. If the visitor does not provide a response then the automatic process terminates. If the visitor does provide a response, then the response is displayed in the chat window, and the process continues at step 410 to determine if it is appropriate to send another response. Alternatively, an operator that is monitoring the conversation may elect to disable the automated message generator and interject himself or herself into the conversation.

Figure 5:
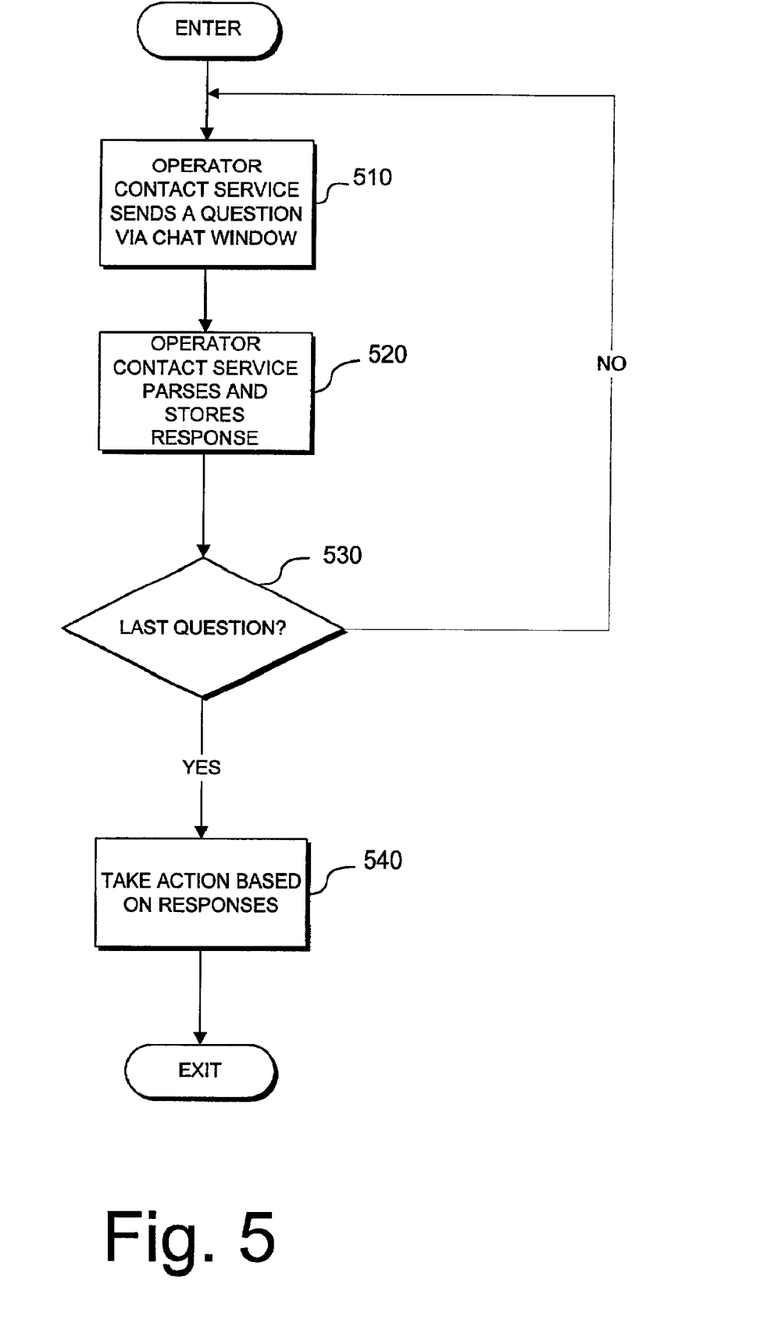
FIG. 5 is a flow diagram of a method for obtaining information from a website visitor consistent with the present invention.

FIG. 5 is a flow diagram of a method for obtaining information from a website visitor consistent with the present invention. This series of steps is invoked, for example, when a website visitor wishes to complete a sales transaction. In this context, the method of FIG. 5 is a zero-click or natural language e-commerce method, meaning that a website visitor who wishes to make a purchase may do so by simply continuing a natural language chat conversation without clicking on any purchase icons or links. Rather than requiring the visitor to click to a separate page into which the visitor can enter his or her payment information, an operator may invoke this zero-click method, which will accept payment information from a website visitor in the same chat format used to provide sales information. This process may be highly automated or a live operator may wish to take part in the dialog.

At step 510 the operator contact service transmits a question (step 510). Questions may be obtained from a database of relevant questions, and an artificial intelligence engine, such as a software program configured to implement stored rules, may be used to integrate known information about the visitor into the process of selecting and formulating questions. The artificial intelligence engine can therefore ensure that only those questions are asked for which an answer is not already known, and the engine can parse the answers for incorporation into the formulation of subsequent questions. For example, if the website visitor is a repeat customer and the visitors payment information is already stored in a database, the artificial intelligence engine could ask the following question: "Would you like to use the same payment and shipping information you used for your last purchase?" Depending on the answer, the artificial-intelligence engine will ask different subsequent questions.

Next the service accepts a response from the website visitor and stores the response for later use (step 520). At step 530 the service determines whether this is the last question in the series of questions. If it is not the last question then the method resumes at step 510 and an additional question is asked. If it is the last question, an appropriate action is taken based on the responses to the questions (step 540). Optionally, an operator can review the gathered information for accuracy before the system takes action based on the responses.

Figure 6:
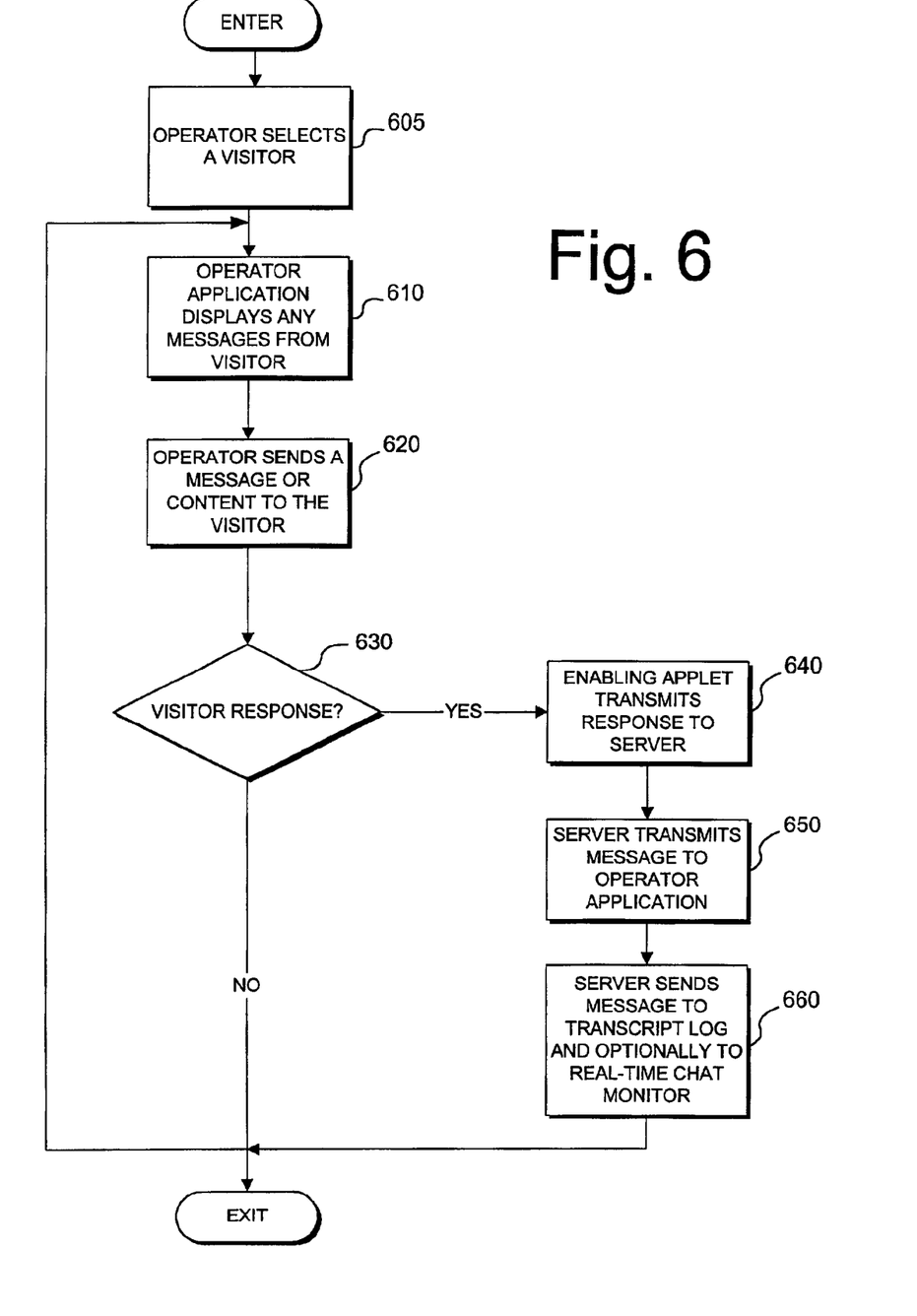
FIG. 6 is a flow diagram of a method of proactively contacting a website visitor and providing information to the visitor, the method consistent with the present invention.

FIG. 6 is a flow diagram of a method of proactively contacting a visitor and providing information consistent with the present invention. Using operator application 190, an operator selects a visitor (step 605). This can be accomplished by using a mouse to click on a row, in a display, that represents a particular visitor within the operator application user interface. Next the operator application 190 receives any pending messages from visitors (step 610). The operator sends a piece of content or information to the visitor (step 620). This content may be a web page, URL, or some other multi-media component. If the operator pushes out a web page or URL to the visitor, then the visitor's web browser will be caused by enabling applet 140 to render that web page or multi-media component. Alternatively, the operator may simply send a textual message to the visitor, and the enabling applet will perform an action such as, for example, causing a chat dialog box like 610 of FIG. 6 to be displayed. From within a dialog box such as 610, the operator and visitor can continue to exchange messages. It is then determined whether the visitor wishes to respond to the content or message sent by the operator (step 630). If the visitor does not wish to respond, he or she may continue accessing the operator contact-enabled website, or he or she may simply leave the website or continue browsing other parts of the Web. If, however, the visitor elects to respond to the information sent by the operator, he or she may send a message to the operator. The enabling applet accepts the message from the visitor and transmits it to the operator contact server (step 640). Then the operator contact service transmits the message to the operator application corresponding to the appropriate operator (step 650). Finally the operator contact service writes a transcript of the messages and optionally transmits the messages to a remote monitor which displays the conversation in real-time (step 660). This process can continue if desired by the operator or visitor.

Figure 7:
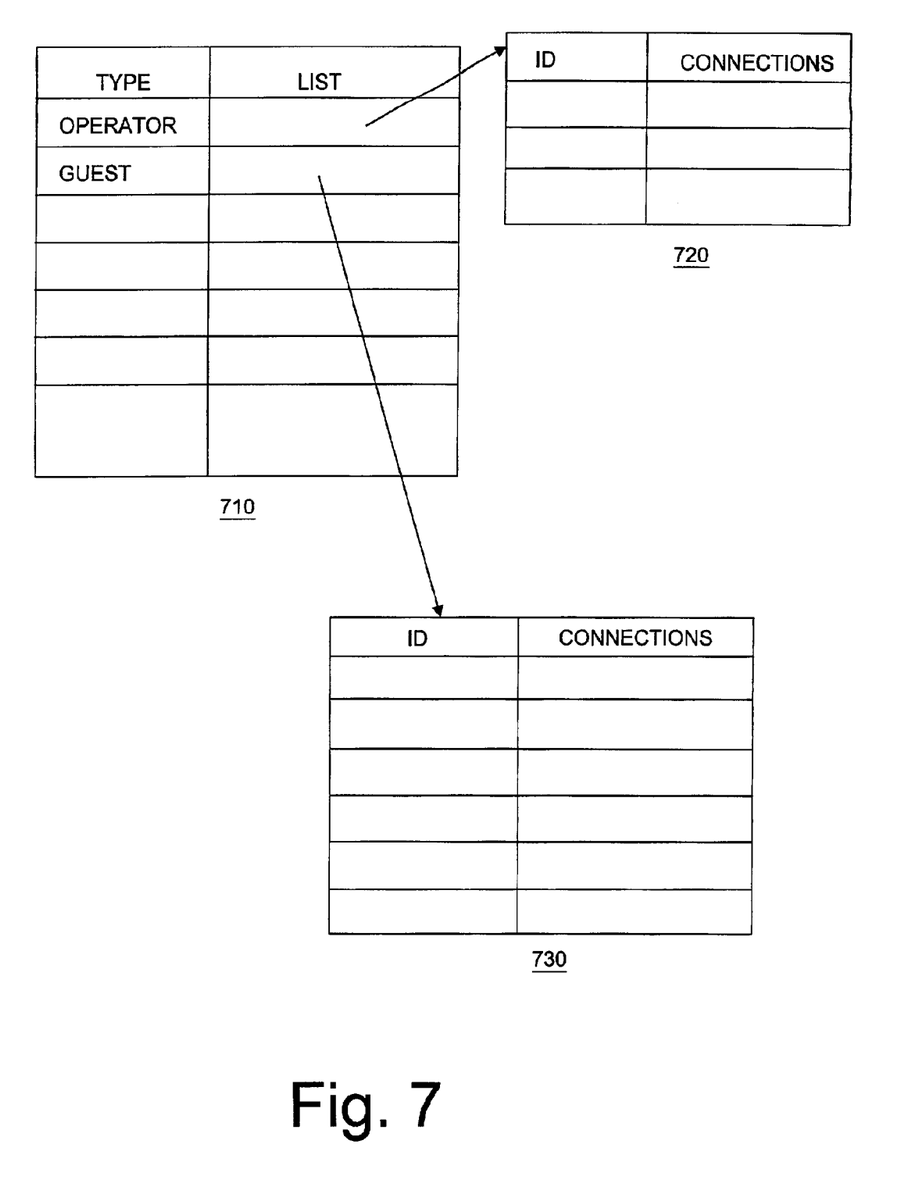
FIG. 7 is a schematic diagram of the website visitor list data structures consistent with the present invention.

FIG. 7 is a schematic diagram of the visitor list data structures consistent with the present invention. The visitor list data structures may be implemented as objects instantiated in a JAVA™ run-time environment. As is known in the art, a hash table is a time-efficient means for looking up records within a list of records. As shown in FIG. 7, a hash table 710 of user types may be used to associate various user types, such as "operator," "guest," etc., where the "operator" type corresponds to an operator and the "guest" user type corresponds to a website visitor. The associated visitor lists corresponding to an individual user type. Each visitor list may be implemented as a hash table, such as hash tables 720 and 730, with a key corresponding to a user identifier and a value corresponding to an array of connection identifiers.

FIG. 8 is a schematic diagram of an operator application user interface consistent with the present invention. From this user interface the operator customizes his or her profile to facilitate proactive website visitor contact. The operator can use the interface to identify particular visitors at the time they are actually viewing web pages. The operator can click on a particular visitor and obtain information about the visitor such as, for example, the particular pages the visitor has accessed and the relevant counts and durations. The operator can find out about the network connection potentially indicating where the visitor is from. The operator can obtain any profile information provided by the user in a registration section. For example, in order to complete a prior transaction, a user may have already communicated all of its demographic and payment information to the operator of a website, and the information may be available in a database. If this is the case, then the operator will have access to this information to help the operator decide how to approach the customer.

In FIG. 8, window 810 is the main window of an operator user interface consistent with the present invention. Main window 810 contains the elements that facilitate the operator interaction with the relevant information. The menu bar 815 provides various options including "Control, Actions, Display and Help." Tab 817 is currently selected and therefore the list of guests or website visitors are displayed. As is known in the art, In a tabbed grid such as this, when other tabs are selected other corresponding grids are displayed. Buttons 830, 840, 850, and 860, provide the functions of path, push, away, and logout respectively. User list entries 870 are displayed in the tabbed grid. This allows the operator to select a tab to view the users by user type. For example one user type may be "guest" and another may be "operator." In this way an operator may view which other operators are connected and which website visitors are being contacted by a particular operator. Lower left quadrant 890 is many be used to display attributes of a monitored user. Lower right hand quadrant 880 represents a list of user properties in a two column attribute, value pair configuration, and can be configured to display any user properties that are available for a particular user.

Figure 9:
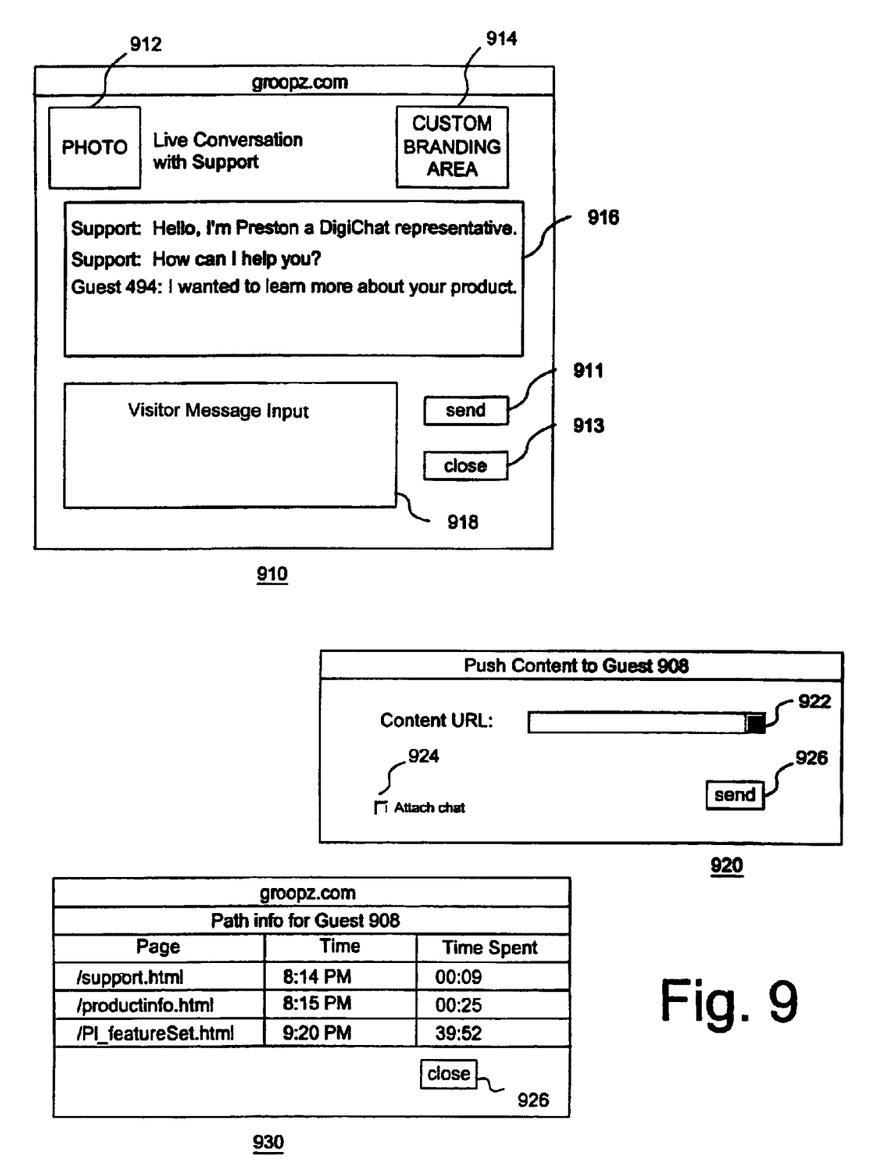
FIG. 9 is a schematic diagram of exemplary dialog boxes that may be used in conjunction with an operator application user interface consistent with the present invention.

FIG. 9 is a schematic diagram of exemplary dialog boxes that may be used in conjunction with an operator application user interface consistent with the present invention. Dialog box 910 is a part of the enabling applet user interface that is presented to a visitor of an operator contact-enabled web page when an operator proactively initiates contact with a website visitor. Custom branding area 914 is optionally used to display custom information specific to the website operator's business. Operator photograph area 912 is optionally used to display a photograph of the operator in order to further personalize the proactive operator contact experience. Chat display window 916 is used to display the messages as they are sent and received by the website visitor and the website operator. Other window elements may be contained in the chat dialog window, including an area for the visitor to type its messages, such as message input box 918. Finally, buttons to send a message or close the window may also be included such as send button 911 and close button 913. Referring back to FIG. 6, step 620 indicates that in addition to having the ability to proactively send textual messages, the operator can also cause the browser of a visitor of an operator contact-enabled web page to display a particular web page or URL. The operator can issue such a command with a dialog box such as dialog box 920. Dialog box 920 allows the operator to type in or select a web page for the enabling applet to cause the visitor's web browser 150 to display. There may also be a check-box 924 in dialog box 920 to specify to the enabling applet that it should also open a chat window to exchange messages between the visitor and the operator.

In one embodiment of the present invention, window 930 is used by the operator to view the user path of a particular website visitor. Window 930 displays the page by URL, the time the page was first accessed, and the amount of time the website visitor spent on the page. This information may be useful to the operator to where a visitor's interests lie so that proactive operator contact can appropriate visitors with an appropriate message.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A method for facilitating on-line communications between an operator of a website and a visitor to the website, the website having operator contact-enabled web pages, and the method comprising the steps of:

maintaining a visitor list of visitors currently accessing operator contact-enabled web pages, the operator contact-enabled web pages comprising an enabling applet that facilitates active communication between an operator and at least one of the visitors;

maintaining information about at least one of the visitors in the visitor list by recording information about the visitor;

transmitting information from a server to a visitor in the list of visitors; and receiving information from the visitor in response to the transmitted information.

2. The method of claim 1, wherein the step of maintaining information about at least one of the visitors further comprises the step of:

maintaining a visitor path record corresponding to at least one of the visitors in the visitor list by recording information about web pages that a visitor accesses.

3. The method of claim 2, wherein the visitor path record further includes:

an amount of time the visitor stays on the operator contact-enabled web page; and an identification of a referring page from which the visitor connected to the operator contact-enabled web page.

4. The method of claim 2, wherein the visitor path record further comprises a list of the web pages the visitor has accessed and the length of time the visitor spent at each page.

5. The method of claim 1, wherein the step of transmitting information further comprises:

providing the visitor list to the operator, the visitor list including a plurality of entries each having a visitor identifier;

receiving a selection of a visitor identifier and of information from the operator; and transmitting the operator-selected information from a server to a website visitor in the list of visitors based on the visitor identifier.

6. The method of claim 5, wherein the step of transmitting operator selected information further comprises:

transmitting a first one of a series of questions directed to obtaining information from a visitor;

receiving a first answer to the first one of the series of questions; and continuing to transmit and receive answers until the series of questions has been answered.

7. The method of claim 5 wherein the step of providing the list of visitors to the operator of the website further comprises providing the operator with a real-time display of the list of visitors.

8. The method of claim 5, wherein the step of receiving a selection of a visitor identifier and of information from the operator further includes:

allowing the operator to send predefined messages to a visitor based on visitor information including the visitor path record.

9. The method of claim 1, wherein the step of transmitting information to a visitor further comprises:

displaying the information using a user interface customized to coordinate with other aspects of the operator contact-enabled website from which the user interface is activated.

10. The method of claim 1, wherein the information in the transmitting and receiving steps is encrypted.

11. The method of claim 1, further comprising:

collecting information about a visitor based on the visitor's interaction with the website;

comparing the information about visitors with predetermined rules, the predetermined rules specifying attributes of a visitor;

obtaining at least one message from a list of messages based on results of the comparison of the visitor information with the predetermined rules; and transmitting the at least one message to a visitor in the list of visitors.

12. The method of claim 11, wherein the predetermined rules are based on properties of the visitor.

13. The method of claim 11, wherein the predetermined rules are based on the web pages that a visitor has accessed.

14. The method of claim 11, wherein the step of transmitting the at least one message further comprises:

transmitting a first one of the at least one message wherein the at least one message comprises a series of questions directed to obtaining information from a visitor;

receiving a first answer to the first one of the series of questions;

parsing the first answer;

storing the parsed first answer; and continuing to transmit questions, and receive, parse, and store answers until the series of questions has been answered.

15. The method of claim 1, wherein the step of maintaining a visitor list further comprises:

maintaining the visitor list by adding a visitor to the visitor list when the visitor loads an operator contact-enabled web page and removing the visitor from the visitor list when the visitor leaves the website.

16. The method of claim 1, wherein the step of maintaining a visitor list further comprises the steps of:

assigning a visitor to a group based on information about the visitor; and maintaining multiple visitor lists based on the group to which the visitor is assigned, wherein the information about the visitor includes visitor properties and a visitor path.

17. The method of claim 16, further comprising:

accepting a message from a visitor and routing the message to an operator based on the group to which the visitor is assigned.

18. The method of claim 16, further comprising:

reassigning a visitor from a first group to a second group based on information about the visitor;

removing the visitor from the visitor list associated with the first group; and adding the visitor to the visitor list associated with the second group.

19. The method of claim 1, wherein loading an operator contact-enabled web page further comprises loading a web page that references an enabling applet.

20. The method of claim 1 further comprising:
   obtaining the information sent to and received from the visitor; and
   transmitting the obtained information to a remote location so that the information sent to and received from the visitor can be remotely monitored.

21. The method of claim 1 further comprising:
   obtaining the information sent to and received from the visitor; and
   storing a transcript of the obtained information.

22. The method of claim 21, wherein the step of storing a transcript further comprises:
   storing the transcript so that there can be controlled access to the transcript.

23. The method of claim 1, further comprising the step of providing a visitor with access to a downloadable file.

24. The method of claim 1, wherein the method further comprises the step of:
   accepting authentication information from the operator before allowing the operator to access the visitor list.

25. The method of claim 1, wherein the method further comprises the step of:
   accepting authentication information from the operator before allowing the operator to contact visitors.

26. The method of claim 1, wherein the method further comprises the step of:
   transmitting a list of operators to a visitor.

27. A computer-readable medium containing instructions for causing a computer system to carry out a method for facilitating on-line communications between an operator of a website and a visitor to the website, the website having operator contact-enabled web pages, and the method comprising the steps of:
   maintaining a visitor list of visitors currently accessing operator contact-enabled web pages, the operator contact-enabled web pages comprising an enabling applet that facilitates active communication between an operator and at least one of the visitors;
   maintaining information about at least one of the visitors in the visitor list by recording information about the visitor;
   transmitting information from a server to a visitor in the list of visitors; and
   receiving information from the visitor in response to the transmitted information.

28. A computer-readable medium according to claim 27, wherein the step of maintaining information about at least one of the visitors further comprises the step of:
   maintaining a visitor path record corresponding to at least one of the visitors in the visitor list by recording information about web pages that a visitor accesses.

29. A computer-readable medium according to claim 27, wherein the step of transmitting information further comprises:
   providing the visitor list to the operator, the visitor list including a plurality of entries each having a visitor identifier;
   receiving a selection of a visitor identifier and of information from the operator; and
   transmitting the operator-selected information from a server to a visitor in the list of visitors based on the visitor identifier.

30. A computer-readable medium according to claim 29, wherein the step of transmitting operator selected information further comprises:
   transmitting a first one of a series of questions directed to obtaining information from a visitor;
   receiving a first answer to the first one of the series of questions; and
   continuing to transmit and receive answers until the series of questions has been answered.

31. A computer-readable medium according to claim 27, wherein the step of transmitting information to a visitor further comprises:
   displaying the information using a user interface customized to coordinate with other aspects of the operator contact-enabled website from which the user interface is activated.

32. A computer-readable medium according to claim 27, wherein the information in the transmitting and receiving steps is encrypted.

33. A computer-readable medium according to claim 27, further comprising:
   collecting information about visitors based on the visitor's interaction with the website;
   comparing the information about visitors with predetermined rules, the predetermined rules specifying attributes of a visitor;
   obtaining at least one message from a list of messages based on results of the comparison of the visitor information with the predetermined rules; and
   transmitting the at least one message to a visitor in the list of visitors.

34. A computer-readable medium according to claim 33, wherein the predetermined rules are based on the properties of the visitor.

35. A computer-readable medium according to claim 33, wherein the predetermined rules are based on the web pages that a visitor has accessed.

36. A computer-readable medium according to claim 33, wherein the step of transmitting the at least one message further comprises:
   transmitting a first one of the at least one message wherein the at least one message comprises a series of questions directed to obtaining information from a visitor;
   receiving a first answer;
   parsing the first answer,
   storing the parsed first answer to the first one of the series of questions; and
   continuing to transmit questions, and receive, parse, and store answers until the series of questions has been answered.

37. A computer-readable medium according to claim 27, wherein the step of maintaining a visitor list further comprises:
   maintaining the visitor list by adding a visitor to the visitor list when the visitor loads an operator contact-enabled web page and removing the visitor from the visitor list when the visitor leaves the website.

38. A computer-readable medium according to claim 27, wherein the visitor path record further includes:
   an amount of time the visitor stays on the operator contact-enabled web page; and an identification of a referring page from which the visitor connected to the operator contact-enabled web page.

39. A computer-readable medium according to claim 27, wherein the step of maintaining a visitor list further comprises the steps of:

assigning a visitor to a group based on information about the visitor; and maintaining multiple visitor lists based on the group to which the visitor is assigned, wherein the information about the visitor includes visitor properties and a visitor path.

40. A computer-readable medium according to claim 39, further comprising:

accepting a message from a visitor and routing the message to an operator based on the group to which the visitor is assigned.

41. A computer-readable medium according to claim 39, further comprising:

reassigning a visitor from a first group to a second group based on information about the visitor;

removing the visitor from the visitor list associated with the first group; and adding the visitor to the visitor list associated with the second group.

42. A computer-readable medium according to claim 27, wherein loading an operator contact-enabled web page further comprises loading a web page that references an enabling applet.

43. A computer-readable medium according to claim 27, further comprising:

obtaining the information sent to and received from the visitor; and transmitting the obtained information to a remote location so that the information sent to and received from the visitor can be remotely monitored.

44. A computer-readable medium according to claim 27 further comprising:

obtaining the information sent to and received from the visitor; and storing a transcript of the obtained information.

45. A computer-readable medium according to claim 44, wherein the step of storing a transcript further comprises:

storing the transcript so that there can be controlled access to the transcript.

46. A computer-readable medium according to claim 27 wherein the step of providing the list of visitors to the operator of the website further comprises providing the operator with a real-time display of the list of visitors.

47. A computer-readable medium according to claim 27, further comprising the step of providing a visitor with access to a downloadable file.

48. A computer-readable medium according to claim 27, wherein the visitor path record further comprises a list of the web pages the visitor has accessed and the length of time the visitor spent at each page.

49. A computer-readable medium according to claim 27, wherein the step of receiving a selection of a visitor identifier and of information from the operator further includes:

allowing the operator to send predefined messages to a visitor based on visitor information including the visitor path record.

50. A computer-readable medium according to claim 27, wherein the method further comprises the step of:

accepting authentication information from the operator before allowing the operator to access the visitor list.

51. A computer-readable medium according to claim 27, wherein the method further comprises the step of:

accepting authentication information from the operator before allowing the operator to contact visitors.

52. A computer-readable medium according to claim 27, wherein the method further comprises the step of:

transmitting a list of operators to a visitor.

53. A system for facilitating on-line communications between an operator of a website and a visitor to the website, the website having operator contact-enabled web pages, and the system comprising:

a processing unit;

an input/output device coupled to the processing unit;

a storage device in communication with the processing unit, the storage device including, program code for maintaining a visitor list of visitors currently accessing operator contact-enabled web pages;

program code for maintaining information about at least one of the visitors in the visitor list by recording information about the visitor;

program code for transmitting information from a server to a visitor in the list of visitors;

program code for receiving information from the visitor in response to the transmitted information; and the operator contact-enabled web pages further comprising an enabling applet that facilitates active communication between an operator and at least one of the visitors.

54. A system as in claim 53, wherein the program code for maintaining information about at least one of the visitors further comprises:

program code for maintaining a visitor path record corresponding to at least one of the visitors in the visitor list by recording information about web pages that a visitor accesses.

55. A system as in claim 53, wherein the program code for transmitting information further comprises:

program code for providing the visitor list to the operator, the visitor list including a plurality of entries each having a visitor identifier;

program code for receiving a selection of a visitor identifier and of information from the operator; and program code for transmitting the operator-selected information from a server to a visitor in the list of visitors based on the visitor identifier.

56. A system as in claim 55, wherein the program code for transmitting operator selected information further comprises:

program code for transmitting a first one of a series of questions directed to obtaining information from a visitor;

program code for receiving a first answer to the first one of the series of questions; and program code for continuing to transmit and receive answers until the series of questions has been answered.

57. A system as in claim 53, wherein the program code for transmitting information to a visitor further comprises:

program code for displaying the information using a user interface customized to coordinate with other aspects of the operator contact-enabled website from which the user interface is activated.

58. A system as in claim 53, wherein the transmitted and received information is encrypted.

59. A system as in claim 53, further comprising:
program code for collecting information about visitors based on the visitor's interaction with the website;
program code for comparing the information about visitors with predetermined rules, the predetermined rules specifying attributes of a visitor;
program code for obtaining at least one message from a list of messages based on results of the comparison of the visitor information with the predetermined rules; and
program code for transmitting the at least one message to a visitor in the list of visitors.

60. A system as in claim 59, wherein the predetermined rules are based on the properties of the visitor.

61. A system as in claim 59, wherein the predetermined rules are based on the web pages that a visitor has accessed.

62. A system as in claim 59, wherein the program code for transmitting the at least one message further comprises:
program code for transmitting a first one of the at least one message wherein the at least one message comprises a series of questions directed to obtaining information from a visitor;
program code for receiving a first answer to the first one of the series of questions;
program code for parsing the first answer;
program code for storing the parsed first answer; and
program code for continuing to transmit questions, and receive, parse, and store answers until the series of questions has been answered.

63. A system as in claim 53, wherein the program code for maintaining a visitor list further comprises:
program code for maintaining the visitor list by adding a visitor to the visitor list when the visitor loads an operator contact-enabled web page and removing the visitor from the visitor list when the visitor leaves the website.

64. A system as in claim 53, wherein the visitor path record further includes:
an amount of time the visitor stays on the operator contact-enabled web page; and
an identification of a referring page from which the visitor connected to the operator contact-enabled web page.

65. A system as in claim 53, wherein the program code for maintaining a visitor list further comprises:
program code for assigning a visitor to a group based on information about the visitor; and
program code for maintaining multiple visitor lists based on the group to which the visitor is assigned, wherein the information about the visitor includes visitor properties and a visitor path.

66. A system as in claim 65, further comprising:
program code for accepting a message from a visitor and routing the message to an operator based on the group to which the visitor is assigned.

67. A system as in claim 65, further comprising:
program code for reassigning a visitor from a first group to a second group based on information about the visitor;
program code for removing the visitor from the visitor list associated with the first group; and
program code for adding the visitor to the visitor list associated with the second group.

68. A system as in claim 53, wherein the program code for loading an operator contact-enabled web page further comprises program code for loading a web page that references an enabling applet.

69. A system as in claim 53 further comprising:
program code for obtaining the information sent to and received from the visitor; and
program code for transmitting the obtained information to a remote location so that the information sent to and received from the visitor can be remotely monitored.

70. A system as in claim 53 further comprising:
program code for obtaining the information sent to and received from the visitor; and
program code-for storing a transcript of the obtained information.

71. A system as in claim 70, wherein the program code for storing a transcript further comprises:
program code for storing the transcript so that there can be controlled access to the transcript.

72. A system as in claim 53 wherein the program code for providing the list of visitors to the operator of the website further comprises program code for providing the operator with a real-time display of the list of visitors.

73. A system as in claim 53, further comprising the program code for providing a visitor with access to a downloadable file.

74. A system as in claim 53, wherein the visitor path record further comprises a list of the web pages the visitor has accessed and the length of time the visitor spent at each page.

75. A system as in claim 53, wherein the program code for receiving a selection of a visitor identifier and of information from the operator further includes:
program code for allowing the operator to send predefined messages to a visitor based on visitor information including the visitor path record.

76. A system as in claim 53, further comprising:
program code for accepting authentication information from the operator before allowing the operator to access the visitor list.

77. A system as in claim 53, further comprising:
program code for accepting authentication information from the operator before allowing the operator to contact visitors.

78. A system as in claim 53, further comprising:
program code for transmitting a list of operators to a visitor.

\* \* \* \* \*